(12) United States Patent
Natanzon

(10) Patent No.: US 9,087,008 B1
(45) Date of Patent: Jul. 21, 2015

(54) REPLICATING A VOLUME USING SNAPSHOTS

(71) Applicant: Assaf Natanzon, Tel Aviv (IL)

(72) Inventor: Assaf Natanzon, Tel Aviv (IL)

(73) Assignee: EMC International Company, Hamilton (BM)

( * ) Notice: Subject to any disclaimer, the term of this patent is extended or adjusted under 35 U.S.C. 154(b) by 178 days.

(21) Appl. No.: 13/924,869

(22) Filed: Jun. 24, 2013

(51) Int. Cl.
*G06F 17/00* (2006.01)
*G06F 11/14* (2006.01)

(52) U.S. Cl.
CPC ................................ *G06F 11/1446* (2013.01)

(58) Field of Classification Search
None
See application file for complete search history.

(56) References Cited

U.S. PATENT DOCUMENTS

| | | | |
|---|---|---|---|
| 7,203,741 B2 | 4/2007 | Marco et al. | |
| 7,694,086 B1 * | 4/2010 | Bezbaruah et al. | 711/162 |
| 7,719,443 B1 | 5/2010 | Natanzon | |
| 7,840,536 B1 | 11/2010 | Ahal et al. | |
| 7,840,662 B1 | 11/2010 | Natanzon | |
| 7,844,856 B1 | 11/2010 | Ahal et al. | |
| 7,860,836 B1 | 12/2010 | Natanzon et al. | |
| 7,882,286 B1 | 2/2011 | Natanzon et al. | |
| 7,934,262 B1 | 4/2011 | Natanzon et al. | |
| 7,958,372 B1 | 6/2011 | Natanzon | |
| 8,037,162 B2 | 10/2011 | Marco et al. | |
| 8,041,940 B1 | 10/2011 | Natanzon et al. | |
| 8,060,713 B1 | 11/2011 | Natanzon | |
| 8,060,714 B1 | 11/2011 | Natanzon | |
| 8,103,937 B1 | 1/2012 | Natanzon et al. | |
| 8,108,634 B1 | 1/2012 | Natanzon et al. | |
| 8,214,612 B1 | 7/2012 | Natanzon | |
| 8,250,149 B2 | 8/2012 | Marco et al. | |
| 8,271,441 B1 | 9/2012 | Natanzon et al. | |
| 8,271,447 B1 | 9/2012 | Natanzon et al. | |
| 8,332,687 B1 | 12/2012 | Natanzon et al. | |
| 8,335,761 B1 | 12/2012 | Natanzon | |
| 8,335,771 B1 | 12/2012 | Natanzon et al. | |
| 8,341,115 B1 | 12/2012 | Natanzon et al. | |
| 8,370,648 B1 | 2/2013 | Natanzon | |
| 8,380,885 B1 | 2/2013 | Natanzon | |
| 8,380,955 B1 * | 2/2013 | Wu | 711/162 |
| 8,392,680 B1 | 3/2013 | Natanzon et al. | |
| 8,429,362 B1 | 4/2013 | Natanzon et al. | |
| 8,433,869 B1 | 4/2013 | Natanzon et al. | |
| 8,438,135 B1 | 5/2013 | Natanzon et al. | |
| 8,464,101 B1 | 6/2013 | Natanzon et al. | |
| 8,473,777 B1 * | 6/2013 | Rangachari et al. | 714/6.12 |
| 8,478,955 B1 | 7/2013 | Natanzon et al. | |
| 8,495,304 B1 | 7/2013 | Natanzon et al. | |
| 8,510,279 B1 | 8/2013 | Natanzon et al. | |
| 8,521,691 B1 | 8/2013 | Natanzon | |
| 8,521,694 B1 | 8/2013 | Natanzon | |
| 8,543,609 B1 | 9/2013 | Natanzon | |
| 8,583,885 B1 | 11/2013 | Natanzon | |

(Continued)

*Primary Examiner* — Hung Le
(74) *Attorney, Agent, or Firm* — Daly, Crowley, Mofford & Durkee, LLP

(57) ABSTRACT

In one aspect, a method to synchronize a replica volume with a production volume includes providing a first snapshot of the production volume and a first dirty list that includes differences between the first snapshot and the replica volume; sending only a portion of the differences between the first snapshot and the replica volume to the replica site associated with a section of the production volume, generating a second snapshot of the production volume, adding differences between the first snapshot and the second snapshot to a second dirty list, erasing the first snapshot of the production volume and renaming the second snapshot to the first snapshot.

15 Claims, 6 Drawing Sheets

(56) References Cited

U.S. PATENT DOCUMENTS

| | | |
|---|---|---|
| 8,600,945 B1 | 12/2013 | Natanzon et al. |
| 8,601,085 B1 | 12/2013 | Ives et al. |
| 8,627,012 B1 | 1/2014 | Derbeko et al. |
| 8,683,592 B1 | 3/2014 | Dotan et al. |
| 8,694,700 B1 | 4/2014 | Natanzon et al. |
| 8,706,700 B1 | 4/2014 | Natanzon et al. |
| 8,712,962 B1 | 4/2014 | Natanzon et al. |
| 8,719,497 B1 | 5/2014 | Don et al. |
| 8,725,691 B1 | 5/2014 | Natanzon |
| 8,725,692 B1 | 5/2014 | Natanzon et al. |
| 8,726,066 B1 | 5/2014 | Natanzon et al. |
| 8,738,813 B1 | 5/2014 | Natanzon et al. |
| 8,745,004 B1 | 6/2014 | Natanzon et al. |
| 8,751,828 B1 | 6/2014 | Raizen et al. |
| 8,769,336 B1 | 7/2014 | Natanzon et al. |
| 8,805,786 B1 | 8/2014 | Natanzon |
| 8,806,161 B1 | 8/2014 | Natanzon |
| 8,825,848 B1 | 9/2014 | Dotan et al. |
| 8,832,399 B1 | 9/2014 | Natanzon et al. |
| 8,850,143 B1 | 9/2014 | Natanzon |
| 8,850,144 B1 | 9/2014 | Natanzon et al. |
| 8,862,546 B1 | 10/2014 | Natanzon et al. |
| 8,892,835 B1 | 11/2014 | Natanzon et al. |
| 8,898,112 B1 | 11/2014 | Natanzon et al. |
| 8,898,409 B1 | 11/2014 | Natanzon et al. |
| 8,898,515 B1 | 11/2014 | Natanzon |
| 8,898,519 B1 | 11/2014 | Natanzon et al. |
| 8,914,595 B1 | 12/2014 | Natanzon |
| 8,924,668 B1 | 12/2014 | Natanzon |
| 8,930,500 B2 | 1/2015 | Marco et al. |
| 8,930,947 B1 | 1/2015 | Derbeko et al. |
| 8,935,498 B1 | 1/2015 | Natanzon |
| 8,949,180 B1 | 2/2015 | Natanzon et al. |
| 8,954,673 B1 | 2/2015 | Natanzon et al. |
| 8,954,796 B1 | 2/2015 | Cohen et al. |
| 8,959,054 B1 | 2/2015 | Natanzon |
| 2003/0182313 A1* | 9/2003 | Federwisch et al. .......... 707/200 |
| 2003/0182326 A1* | 9/2003 | Patterson ...................... 707/204 |
| 2005/0033929 A1* | 2/2005 | Burton et al. ................. 711/162 |
| 2007/0094467 A1* | 4/2007 | Yamasaki ..................... 711/162 |
| 2007/0271429 A1* | 11/2007 | Eguchi et al. ................. 711/162 |
| 2010/0299309 A1* | 11/2010 | Maki et al. .................... 707/640 |
| 2011/0191295 A1* | 8/2011 | Ozdemir et al. ............... 707/639 |
| 2012/0077165 A1* | 3/2012 | Liang ............................. 434/261 |
| 2012/0210064 A1* | 8/2012 | Coronado et al. ............ 711/118 |
| 2013/0326171 A1* | 12/2013 | Pittelko ......................... 711/162 |
| 2014/0181027 A1* | 6/2014 | Whitehead et al. ........... 707/639 |

\* cited by examiner

REPLICATING A VOLUME USING SNAPSHOTS

BACKGROUND

Computer data is vital to today's organizations and a significant part of protection against disasters is focused on data protection. As solid-state memory has advanced to the point where cost of memory has become a relatively insignificant factor, organizations can afford to operate with systems that store and process terabytes of data.

Conventional data protection systems include tape backup drives, for storing organizational production site data on a periodic basis. Another conventional data protection system uses data replication, by creating a copy of production site data of an organization on a secondary backup storage system, and updating the backup with changes. The backup storage system may be situated in the same physical location as the production storage system, or in a physically remote location. Data replication systems generally operate either at the application level, at the file system level, or at the data block level.

SUMMARY

In one aspect, a method to synchronize a replica volume with a production volume includes providing a first snapshot of the production volume and a first dirty list that includes differences between the first snapshot and the replica volume; sending only a portion of the differences between the first snapshot and the replica volume to the replica site associated with a section of the production volume, generating a second snapshot of the production volume, adding differences between the first snapshot and the second snapshot to a second dirty list, erasing the first snapshot of the production volume and renaming the second snapshot to the first snapshot.

In another aspect, an apparatus includes electronic hardware circuitry to synchronize a replica volume with a production volume. The circuitry is configured to provide a first snapshot of the production volume and a first dirty list that includes differences between the first snapshot and the replica volume, send only a portion of the differences between the first snapshot and the replica volume to the replica site associated with a section of the production volume, generate a second snapshot of the production volume, add differences between the first snapshot and the second snapshot to a second dirty list, erase the first snapshot of the production volume and rename the second snapshot to the first snapshot. The circuitry includes at least one of a processor, a memory, a programmable logic device or a logic gate.

In a further aspect, an article includes a non-transitory computer-readable medium that stores computer-executable instructions to synchronize a replica volume with a production volume. The instructions cause a machine to provide a first snapshot of the production volume and a first dirty list comprising differences between the first snapshot and the replica volume, send only a portion of the differences between the first snapshot and the replica volume to the replica site associated with a section of the production volume, generate a second snapshot of the production volume, add differences between the first snapshot and the second snapshot to a second dirty list, erase the first snapshot of the production volume and rename the second snapshot to the first snapshot.

DETAILED DESCRIPTION

Figure 1A:
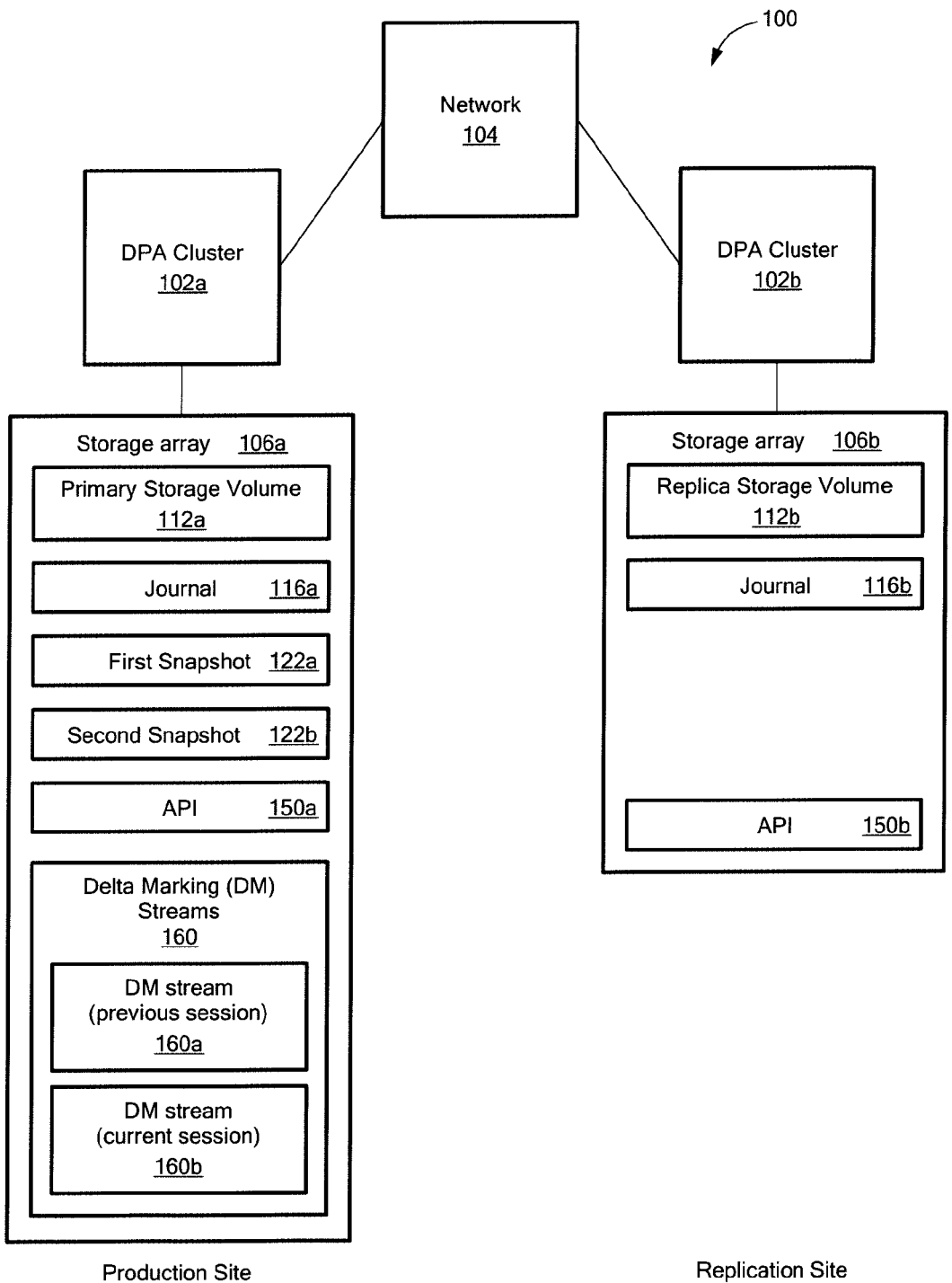
FIG. 1A is a block diagram of an example of a data protection system.

Described herein is an approach to replicate data from a production volume to a replication volume by using snapshots of the production volume. A snapshot is generated on the production site and the differences between a current snapshot and the last snapshot is sent to the replication site. There is a desire to keep snapshots short-lived. That is, the time between snapshots should be kept relatively short. Otherwise, the differences between successive snapshots become larger. However, when the first time a snapshot is shipped to the replication site, there is no reference snapshot at the replication site available so that prior to sending differences between the first snapshot and the second snapshot, the entire volume of data for a production volume is shipped first to the replications site. Since the volume may be large (e.g., several hundred terabytes) the snapshot may take a significant amount of time to transfer (e.g., days or weeks). As described herein only a portion of the production volume will be synchronized with the replication volume at a time and the snapshots will also be refreshed. Once the entire volume has been synchronized, the process will be repeated, but only to synchronize differences between the production volume and the replica volume, which were collected by adding the difference between the snapshots at the production site during snapshot refresh times. If the difference between production and replica volume is small enough, the system will move to a snapshot shipping mode.

The following definitions may be useful in understanding the specification and claims.

BACKUP SITE—a facility where replicated production site data is stored; the backup site may be located in a remote site or at the same location as the production site;

BOOKMARK—a bookmark is metadata information stored in a replication journal which indicates a point in time.

DATA PROTECTION APPLIANCE (DPA)—a computer or a cluster of computers responsible for data protection services including inter alia data replication of a storage system, and journaling of I/O requests issued by a host computer to the storage system;

DELTA MARKING STREAM—is the tracking of the delta (differences) between the production and replication site, which may contain the meta data of changed locations, the delta marking stream may be kept persistently on the journal at the production site of the replication, based on the delta marking data the DPA knows which locations are different between the production and the replica and transfers them to the replica to make both sites identical;

HOST—at least one computer or networks of computers that runs at least one data processing application that issues I/O requests to one or more storage systems; a host is an initiator with a SAN;

HOST DEVICE—an internal interface in a host, to a logical storage unit;

IMAGE—a copy of a logical storage unit at a specific point in time;

INITIATOR—a node in a SAN that issues I/O requests;

I/O REQUEST—an input/output request (sometimes referred to as an I/O), which may be a read I/O request (sometimes referred to as a read request or a read) or a write I/O request (sometimes referred to as a write request or a write);

JOURNAL—a record of write transactions issued to a storage system; used to maintain a duplicate storage system, and to roll back the duplicate storage system to a previous point in time;

LOGICAL UNIT—a logical entity provided by a storage system for accessing data from the storage system. The logical disk may be a physical logical unit or a virtual logical unit;

LUN—a logical unit number for identifying a logical unit;

PHYSICAL LOGICAL UNIT—a physical entity, such as a disk or an array of disks, for storing data in storage locations that can be accessed by address;

PRODUCTION SITE—a facility where one or more host computers run data processing applications that write data to a storage system and read data from the storage system;

REMOTE ACKNOWLEDGEMENTS—an acknowledgement from remote DPA to the local DPA that data arrived at the remote DPA (either to the appliance or the journal)

SAN—a storage area network of nodes that send and receive an I/O and other requests, each node in the network being an initiator or a target, or both an initiator and a target;

SOURCE SIDE—a transmitter of data within a data replication workflow, during normal operation a production site is the source side; and during data recovery a backup site is the source side, sometimes called a primary side;

STORAGE SYSTEM—a SAN entity that provides multiple logical units for access by multiple SAN initiators TARGET—a node in a SAN that replies to I/O requests;

TARGET SIDE—a receiver of data within a data replication workflow; during normal operation a back site is the target side, and during data recovery a production site is the target side, sometimes called a secondary side;

VIRTUAL LOGICAL UNIT—a virtual storage entity which is treated as a logical unit by virtual machines;

WAN—a wide area network that connects local networks and enables them to communicate with one another, such as the Internet.

Referring to FIG. 1A, a data protection system 100 includes a data protection appliance (DPA) cluster 102a and a storage array 106a at a production site and a DPA cluster 102b and a storage array 106b at a replication site. The DPA clusters 102a, 102b are connected by a network 104 (e.g., a WAN, a Fibre Channel and so forth).

The storage array 106a includes a primary storage volume 112a, a journal 116a, a first snapshot 122a, a second snapshot 122b, APIs 150a and delta marking streams 160 (e.g., a delta marking stream for a previous session 160a and a delta marking stream for a current session 160b). The storage array 106b includes a replica storage volume 112b which replicates the primary storage 112a, a journal 116b and APIs 150b.

Figure 1B:
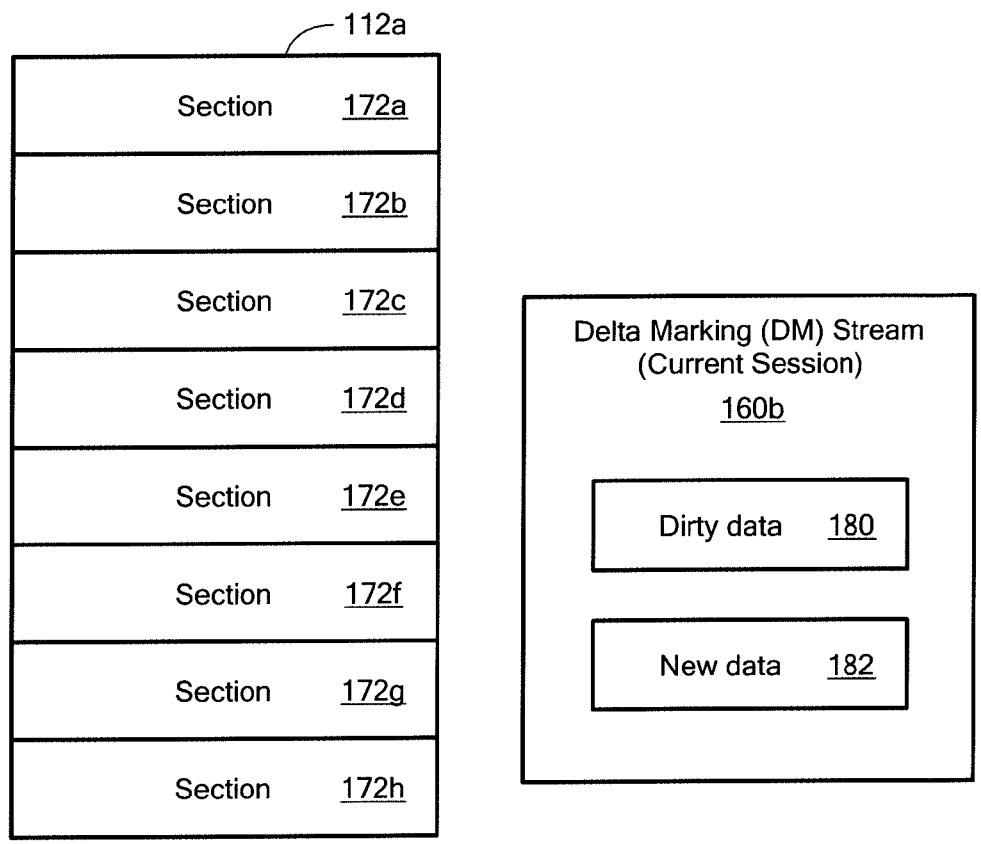
FIG. 1B are block diagrams of components of the data protection system in FIG. 1A.

Referring to FIG. 1B, as will be further described herein, the primary storage volume 112a is divided into sections (e.g., sections 172a-172h) in order to send the entire primary storage volume to the replica site but done so one section at a time. The delta marking stream (current session) 160b includes dirty data 180 and new data 182 being added for example as a result of an application (not shown) writing data to the primary storage volume 112a.

Figure 2:
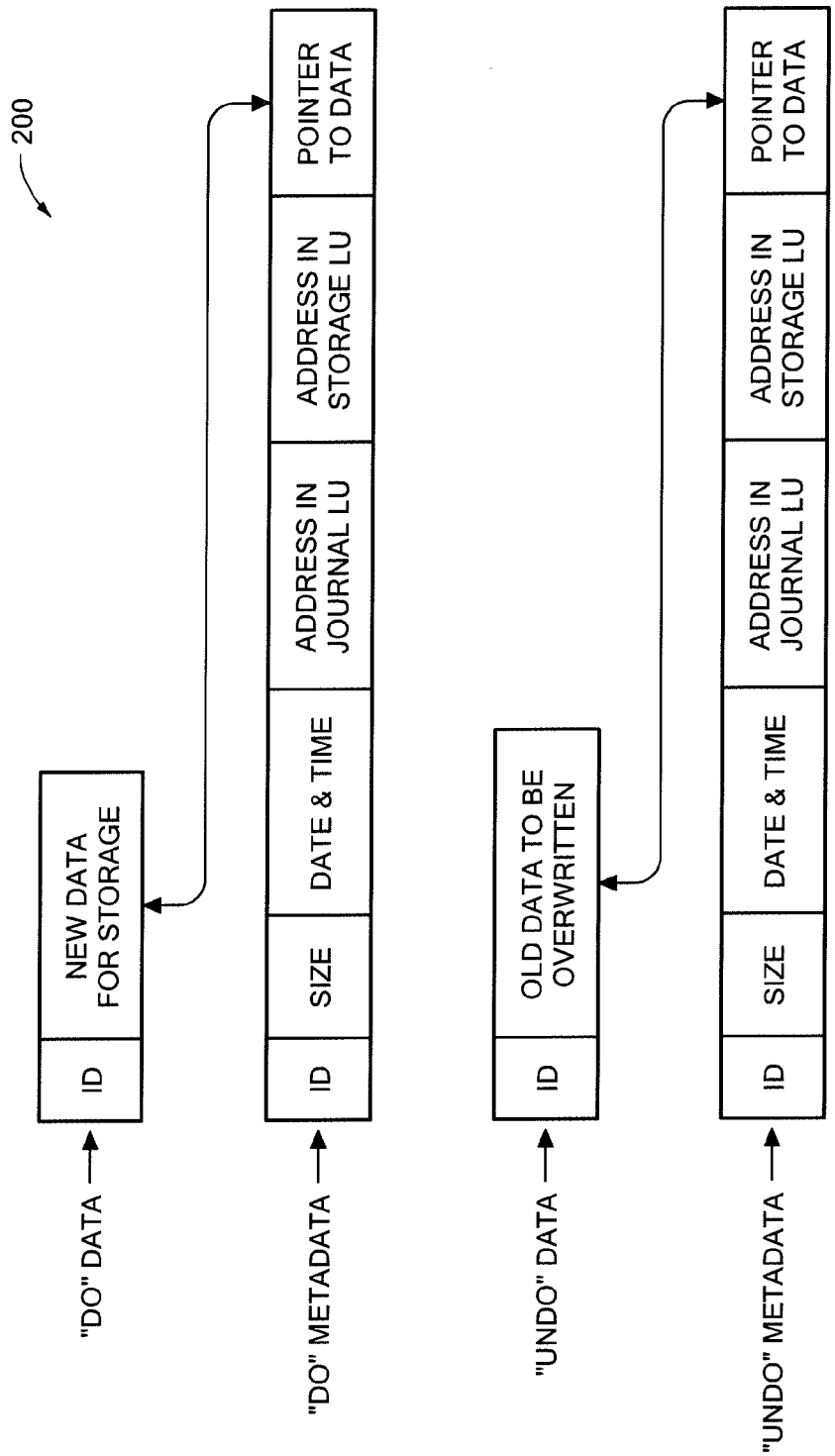
FIG. 2 is an illustration of an example of a journal history of write transactions for a storage system.

Referring to FIG. 2, which is an illustration of a write transaction 200 for a journal. The journal 116a may be used to provide an adaptor for access to storage 112a at the state it was in at any specified point in time. Since the journal contains the "undo" information necessary to roll back storage system 100, data that was stored in specific memory locations at the specified point in time may be obtained by undoing write transactions that occurred subsequent to such point in time.

Write transaction 200 generally includes the following fields: one or more identifiers; a time stamp, which is the date & time at which the transaction was received by source side DPA 102a; a write size, which is the size of the data block; a location in journal LU (not shown) where the data is entered; a location in the replica volume 112b where the data is to be written; and the data itself.

Write transaction 200 is transmitted from source side DPA 102a to target side DPA 102b. As shown in FIG. 2, DPA 102b records the write transaction 200 in the journal that includes four streams. A first stream, referred to as a DO stream, includes new data for writing in the replica volume 112b. A second stream, referred to as an DO METADATA stream, includes metadata for the write transaction, such as an identifier, a date & time, a write size, a beginning address in the replica volume 112b for writing the new data in, and a pointer to the offset in the DO stream where the corresponding data is located. Similarly, a third stream, referred to as an UNDO stream, includes old data that was overwritten in the replica volume 112b; and a fourth stream, referred to as an UNDO METADATA, include an identifier, a date & time, a write size, a beginning address in the replica volume 112b where data was to be overwritten, and a pointer to the offset in the UNDO stream where the corresponding old data is located.

In practice each of the four streams holds a plurality of write transaction data. As write transactions are received dynamically by target DPA 102b, they are recorded at the end of the DO stream and the end of the DO METADATA stream, prior to committing the transaction. During transaction application, when the various write transactions are applied to the replica volume 112b, prior to writing the new DO data into addresses within the storage system, the older data currently located in such addresses is recorded into the UNDO stream. In some examples, the metadata stream (e.g., UNDO METADATA stream or the DO METADATA stream) and the data stream (e.g., UNDO stream or DO stream) may be kept in a single stream each (i.e., one UNDO data and UNDO METADATA stream and one DO data and DO METADATA stream) by interleaving the metadata into the data stream. When stored in a deduplication-based storage, the journal data in the DO and UNDO streams is written to aligned with the storage block, i.e. if the deduplication block of the storage is 4 KB, all journaled I/Os start at an offset which is a multiple of 4 KB and are of size which is a multiple of 4 KB.

Figure 3:
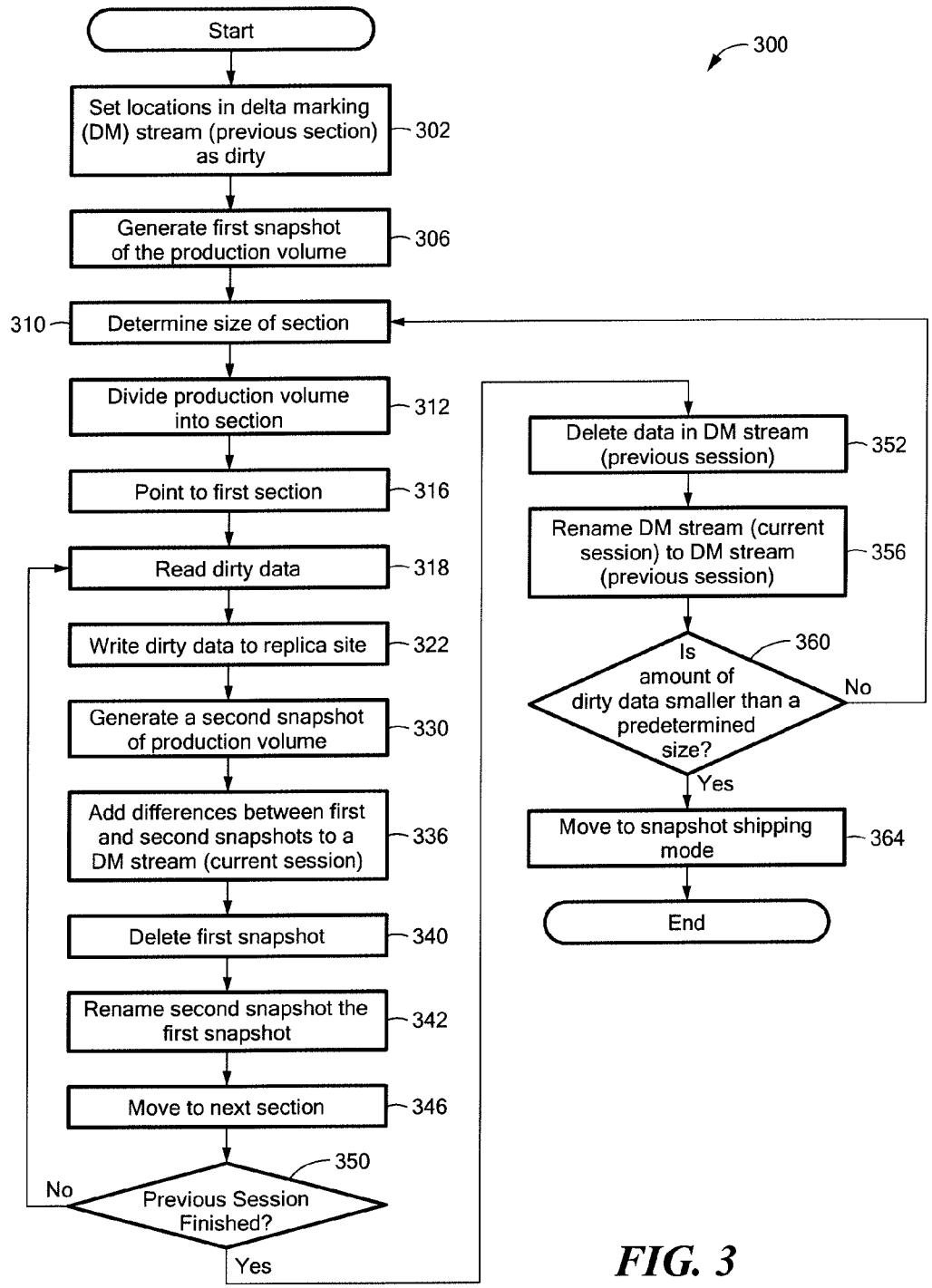
FIG. 3 is a flowchart of an example of a process to initially send a snapshot of a production volume to a replication site.

Referring to FIG. 3, an example of a process to initially send a snapshot of a production volume to the replication site is a process 300. Process 300 sets all locations in the delta marking stream (previous section) 160a as dirty (302). For example, a location is dirty if the data for a location in the replica storage volume 112b does not match the data for the same location in the primary storage volume 112a. All locations are marked dirty in the delta marking stream (previous section) 160a because there is no previous section yet in the process 300.

Process 300 generates a first snapshot of the production volume (306). For example, a first snapshot 122a is generated of the primary storage volume 112a.

Process 300 determines a size of a section (310). For example, based on the amount of dirty locations in the delta marking stream (previous section) 160a, a size of a section will be determined. In one particular example, this is done by reading the metadata information in the delta marker stream and calculating the amount of dirty data available.

Process 300 will divide the production volume into sections. For example, the primary storage volume 112a is divided into the sections having a size determined in processing block 310 (312).

Process 300 points to the first section (316). For example, the first section of the primary storage volume 112a will be synchronized first.

Process 300 reads dirty data (318). For example, data from the dirty locations according to the delta marking (previous session) 160a is read from the current section.

Process 300 writes the dirty data to the replica site (322). For example, the dirty data read from production storage array 106a is sent to the replica site and written to the replica storage array 106b.

Process 300 generates a second snapshot of the production volume (330). For example, a second snapshot 122b is generated of the primary storage volume 112a.

Process 300 adds differences between the first and second snapshots to the delta marking stream (current session) (336). For example, the differences between the first snapshot 122a and the second snapshot 122b are added to the delta marking stream (current session) 160b. In one example, the system 100 can filter out data which is marked to be synchronized in one of the next sections, i.e., if a location is to be marked as dirty for new data 182 in the DM stream (current session) 160b but is already marked as dirty in dirty data in the DM stream (previous session) 160a, and belongs to a section not yet synchronized, then this data is not added to the new data 182.

Process 300 deletes the first snapshot (340), renames the second snapshot the first snapshot (342) and moves to the next section (346). Process 300 determines if going over the dirty locations in the delta marking stream for a previous session is finished (350). As used herein a session is a process where a list of the dirty data is obtained, all of the volume is read for all of the dirty data in the list and the dirty data is sent to the replica volume.

A section (e.g., one of the sections 172a-172h) is a part of a session where part of the dirty data of the session is synchronized. For example, if all of volume is dirty, the session includes reading all of the data in the volume, but each section may be 1% of the volume so that there are a hundred sections in the session. In the k-th section the volume area from offset k % to k+1% is synchronized.

If not finished going over the dirty locations in the delta marking stream for the previous session, process 300 returns to the processing block 318 and process the next section in the session.

If finished going over the dirty locations in the delta marking stream for the previous session, process 300 deletes data from the previous session (352) and renames the current session to be the previous session (356).

Process 300 determines if the amount of dirty data is smaller than a predetermined size (360). For example, the predetermined size is 10 GB. If the amount of dirty data is not smaller than a predetermined size, process 300 returns to processing block 310. When process 300 returns to processing block 310 the amount of dirty locations is most likely to be less than the previous time processing block 310 was performed so that the size of the sections would be larger. For example, if the section size was previously 10 Gigabytes, the section size on the second pass may be 40 Gigabytes.

If the amount of dirty data is smaller than a predetermined size, process 300 moves to a snapshot shipping mode (364).

Figure 4:
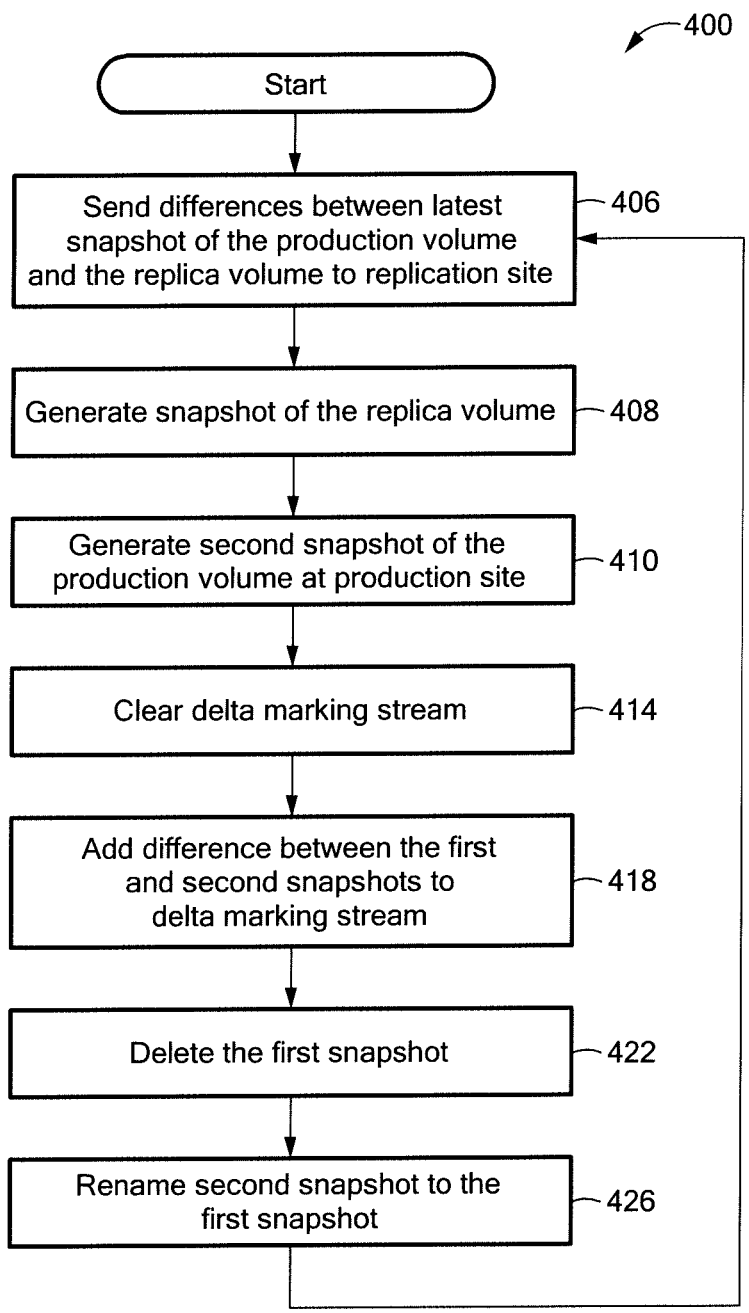
FIG. 4 is a flowchart of an example of a process to perform a snapshot shipping mode to send data from the production site to the replication site.

Referring to FIG. 4, an example of a process to perform the snapshot shipping mode to send data from the production site to the replication site is a process 400.

Process 400 sends differences between the latest snapshot of the production volume and the replica site volume to the replication site (406). For example, the differences between the first snapshot 122a and the current image at the replica site are sent to the replication site. The differences are already marked in the delta marking stream at processing block 364.

Process 400 generates a snapshot of the replica volume containing a copy of the first snapshot of the production site (408).

Process 400 generates a second snapshot of the production volume at the production site (410). For example, the second snapshot 122b is generated.

Process 400 clears the delta marking stream at the production site (414) and adds differences between the first snapshot and the second snapshot to the delta marking stream (418). At this point in the process 400, only one DM stream exists, since one of the DM streams (DM stream (previous session) 160a) was deleted in processing block 352 (FIG. 3).

Process 400 deletes the first snapshot (422), renames the second snapshot to the first snapshot (426) and returns to processing block 404.

Figure 5:
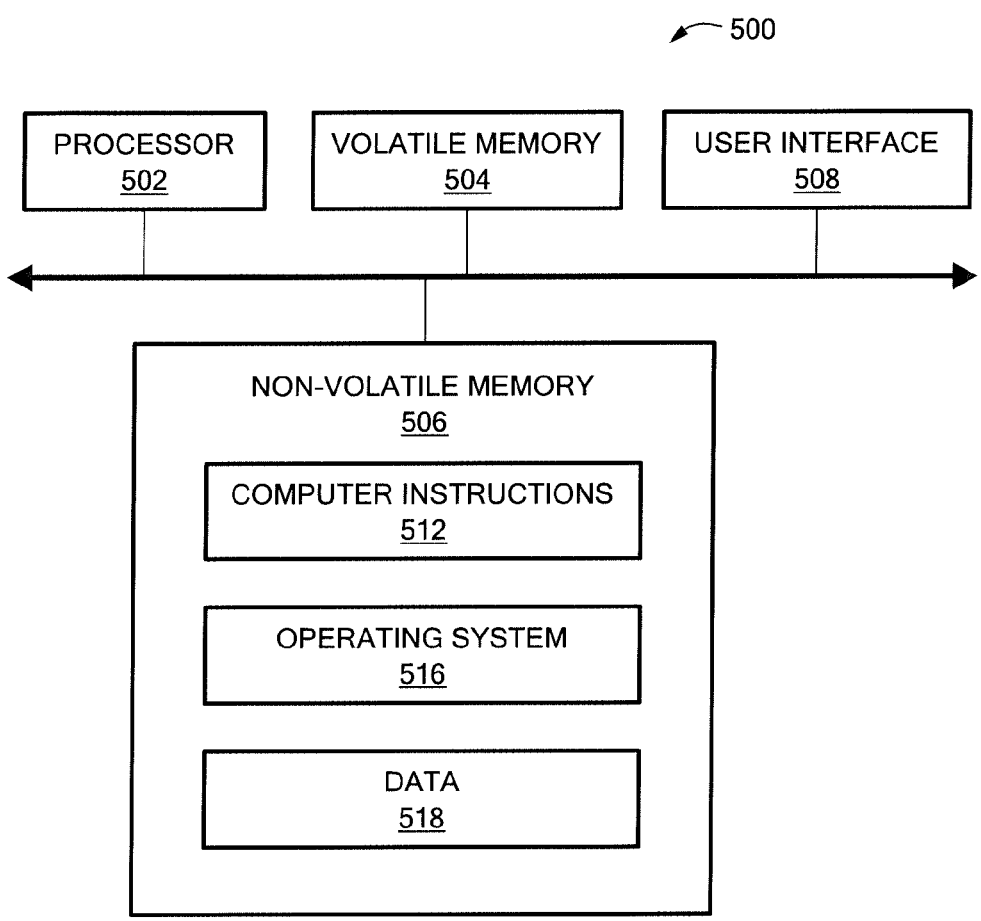
FIG. 5 is a computer on which any of the processes of FIGS. 3 and 4 may be implemented.

Referring to FIG. 5, in one example, a computer 500 includes a processor 502, a volatile memory 504, a non-volatile memory 506 (e.g., hard disk) and the user interface (UI) 508 (e.g., a graphical user interface, a mouse, a keyboard, a display, touch screen and so forth). The non-volatile memory 506 stores computer instructions 512, an operating system 516 and data 518. In one example, the computer instructions 512 are executed by the processor 502 out of volatile memory 504 to perform all or part of the processes described herein (e.g., processes 300 and 400).

The processes described herein (e.g., processes 300 and 400) are not limited to use with the hardware and software of FIG. 5; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The processes described herein are not limited to the specific examples described. For example, the processes 300 and 400 are not limited to the specific processing order of FIGS. 3 and 4, respectively. Rather, any of the processing blocks of FIGS. 3 and 4 may be re-ordered, combined or removed, performed in parallel or in serial, as necessary, to achieve the results set forth above.

The processing blocks (for example, in the processes 300 and 400) associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)). All or part of the system may be implemented using electronic hardware circuitry that include electronic devices such as, for example, at least one of a processor, a memory, a programmable logic device or a logic gate.

Elements of different embodiments described herein may be combined to form other embodiments not specifically set forth above. Other embodiments not specifically described herein are also within the scope of the following claims.

What is claimed is:

1. A method to synchronize a replica volume with a production volume comprising:
    providing a first snapshot of the production volume and a first dirty list comprising differences between the first snapshot and the replica volume;
    sending only a portion of the differences between the first snapshot and the replica volume to the replica site associated with a section of the production volume;
    generating a second snapshot of the production volume;
    adding differences between the first snapshot and the second snapshot to a second dirty list;
    erasing the first snapshot of the production volume;
    renaming the second snapshot to the first snapshot;
    dividing the production volume into sections, each section corresponding to a portion of the production volume, wherein a size of a section is determined by an amount of dirty data in the first set of sections;
    erasing the first dirty list;
    renaming the second dirty list to be the first dirty list if all of the sections of the replica volume have been synchronized with the production volume;
    determining whether an amount of dirty locations in the second dirty list is smaller than a predetermined size; and
    performing a snapshot shipping mode if the amount of dirty locations in the second dirty list is smaller than a predetermined size.

2. The method of claim 1 wherein providing the first snapshot of the production volume and the first dirty list comprising the differences between the first snapshot and the replica volume comprises providing a first ditty list comprising all locations in the production volume.

3. The method of claim 1 wherein adding differences between the first snapshot and the second snapshot to a second dirty list comprises adding locations which are not marked as dirty in the first dirty list for a section which was not yet synchronized.

4. A method to synchronize a replica volume with a production volume comprising:
    providing a first snapshot of the production volume and a first dirty list comprising differences between the first snapshot and the replica volume;
    sending only a portion of the differences between the first snapshot and the replica volume to the replica site associated with a section of the production volume;
    generating a second snapshot of the production volume;
    adding differences between the first snapshot and the second snapshot to a second dirty list;
    erasing the first snapshot of the production volume;
    renaming the second snapshot to the first snapshot;
    dividing the production volume into sections, each section corresponding to a portion of the production volume, wherein a size of a section is determined by an amount of dirty data in the first set of sections;
    erasing the first dirty list;
    renaming the second dirty list to be the first dirty list if all of the sections of the replica volume have been synchronised with the production volume;
    sending all the changes in the first dirty list to the replica volume;
    generating a snapshot of the replica volume; and
    erasing the first dirty list.

5. The method of claim 4, wherein the snapshot shipping mode further comprises:
    generating a second snapshot of the production volume;
    adding the differences between the second and first snapshots to the first dirty list;
    erasing the first snapshot; and
    renaming the second snapshot to be the first snapshot.

6. The method of claim 4 wherein providing the first snapshot of the production volume and the first dirty list comprising the differences between the first snapshot and the replica volume comprises providing a first dirty list comprising all locations in the production volume.

7. The method of claim 4 wherein adding differences between the first snapshot and the second snapshot to a second dirty list comprises adding locations which are not marked as dirty in the first dirty list for a section which was not yet synchronized.

8. An apparatus, comprising:
    electronic hardware circuitry to synchronize a replica volume with a production volume, the circuitry configured to:
        provide a first snapshot of the production volume and a first dirty list comprising differences between the first snapshot and the replica volume;
        send only a portion of the differences between the first snapshot and the replica volume to the replica site associated with a section of the production volume;
        generate a second snapshot of the production volume;
        add differences between the first snapshot and the second snapshot to a second dirty list;
        erase the first snapshot of the production volume;

rename the second snapshot to the first snapshot, wherein the circuitry comprises at least one of a processor, a memory, a programmable logic device or a logic gate;
divide the production volume into sections, each section corresponding to a portion of the production volume, wherein a size of a section is determined by an amount of dirty data in the first set of sections;
erase the first dirty list;
rename the second dirty list to be the first dirty list if all of the sections of the replica volume have been synchronized with the production volume;
determine whether an amount of dirty locations in the second dirty list is smaller than a predetermined size; and
perform a snapshot shipping mode if the amount of dirty locations in the second dirty list is smaller than a predetermined size.

9. The apparatus of claim 8, further comprising circuitry configured to:
send all the changes in the first dirty list to the replica volume;
generate a snapshot of the replica volume; and
erase the first dirty list;
wherein the snapshot shipping mode further comprises circuitry configured to:
generate a second snapshot of the production volume;
add the differences between the second and first snapshots to the first dirty list;
erase the first snapshot; and
rename the second snapshot to be the first snapshot.

10. The apparatus of claim 8 wherein the circuitry configured to provide the first snapshot of the production volume and the first dirty list comprising the differences between the first snapshot and the replica volume comprises circuitry configured to provide a first dirty list comprising all locations in the production volume.

11. The apparatus of claim 8 wherein the circuitry configured to add differences between the first snapshot and the second snapshot to a second dirty list comprises circuitry configured to add locations which are not marked as dirty in the first dirty list for a section which was not yet synchronized.

12. An article comprising;
a non-transitory computer-readable medium that stores computer-executable instructions to synchronize a replica volume with a production volume, the instructions causing a machine to:
provide a first snapshot of the production volume and a first dirty list comprising differences between the first snapshot and the replica volume;
send only a portion of the differences between the first snapshot and the replica volume to the replica site associated with a section of the production volume;
generate a second snapshot of the production volume;
add differences between the first snapshot and the second snapshot to a second dirty list;
erase the first snapshot of the production volume;
rename the second snapshot to the first snapshot;
divide the production volume into sections, each section corresponding to a portion of the production volume, wherein a size of a section is determined by an amount of dirty, data in the first set of sections;
erase the first dirty list;
rename the second dirty list to be the first dirty list if all of the sections of the replica volume have been synchronized with the production volume;
determine whether an amount of dirty locations in the second dirty list is smaller than a predetermined size; and
perform a snapshot shipping mode if the amount of dirty locations in the second dirty list is smaller than a predetermined size.

13. The apparatus of claim 12, further comprising instructions causing the machine to:
send all the changes in the first dirty list to the replica volume;
generate a snapshot of the replica volume; and
erase the first dirty list;
Wherein the snapshot shipping mode farther comprises instructions causing the machine to:
generate a second snapshot of the production volume;
add the differences between the second and first snapshots to the first dirty list;
erase the first snapshot; and
rename the second snapshot to be the first snapshot.

14. The apparatus of claim 12 wherein the instructions causing the machine to provide the first snapshot of the production volume and the first dirty list comprising the differences between the first snapshot and the replica volume comprises instructions causing the machine to provide a first dirty list comprising all locations in the production volume.

15. The apparatus of claim 12 wherein the instructions causing the machine to add differences between the first snapshot and the second snapshot to a second dirty list comprises instructions causing the machine to add locations which are not marked as dirty in the first dirty list for a section Which was not yet synchronized.

* * * * *